May 6, 1969 A. W. HARRISON 3,442,353
DISC BRAKES AND SUPPORTING MEANS THEREFOR
Filed July 11, 1966 Sheet 4 of 13

United States Patent Office 3,442,353
Patented May 6, 1969

1

3,442,353
DISC BRAKES AND SUPPORTING
MEANS THEREFOR
Anthony William Harrison, Birmingham, England,
assignor to Girling Limited, Birmingham, England
Filed July 11, 1966, Ser. No. 564,272
Claims priority, application Great Britain, July 10, 1965,
29,363/65
Int. Cl. F16d 55/00
U.S. Cl. 188—73        5 Claims

ABSTRACT OF THE DISCLOSURE

A disc brake of the type utilizing a stationary torque plate for supporting and guiding a directly actuated friction element on one side of a disc and for also supporting a yoke member which straddles the disc and carries an indirectly actuated friction element on the other side of the disc, actuator means for moving the first element into engagement with the disc and by reaction moving the yoke member in the opposite direction to apply the second element to the disc, the torque plate providing a pair of circumferentially spaced mounting and guiding means for the yoke member, the invention comprising the addition of a third mounting and guiding means for the yoke member spaced axially away from the first pair of guiding means, the three mounting and guiding means cooperating to oppose any turning couple exerted by the indirectly actuated element on the yoke member when the element is in braking engagement with a rotating disc.

---

This invention concerns disc brakes and relates more particularly to spot type disc brakes of the kind in which only one of the friction elements is directly moved into engagement with the brake disc or other rotor, the other friction element being displaced as a result of the reaction forces set up by such engagement and for this purpose being carried by a member which is slidable in consequence of those reaction forces.

In disc brakes of the kind described, the slidable member usually takes the form of a so-called caliper or housing for the friction elements and for actuating means such as a hydraulic piston and cylinder arrangement, or alternatively it may be a yoke plate upon which the indirectly actuated friction element and the actuator means are mounted, the caliper or the yoke plate being slidably supported by a fixed part of the brake and being displaceable by the reaction of the actuator means during a braking operation.

Problems can arise in disc brakes as, for example when a vehicle is moving over irregular surfaces, in that unstable conditions can occur and the caliper or the yoke plate can oscillate on the fixed part which supports it. The invention seeks to provide a brake which is of more stable construction and less liable to such oscillation than presently available brakes and which is thus more reliable in service. The invention further seeks to provide a brake which is economical to manufacture, simple to service and which employs, so far as possible, standardised parts which may be used on either hand of brake.

It is an object of the present invention to provide a disc brake of the type described above which overcomes the aforementioned problems.

Other objects of the invention will become clear from the subsequent description and claims.

According to the present invention, a brake of the kind described includes a torque plate located at one side of a rotor and arranged to provide at least a three point support for a caliper or for a yoke plate which straddles the rotor.

2

Preferably the centre of gravity of the caliper or of the yoke plate in combination with an actuator lies within the triangle defined by the three support points, while one of the support points may additionally act to oppose any turning couple which may be exerted by the indirectly actuated friction element when the brake is applied, thus guarding against the possibility of the caliper of the yoke plate being forced out of alignment with its sliding supports and binding in these supports.

The invention will be described further, by way of example, with reference to the accompanying generally diagrammatic drawings, in which:

Figure 1:
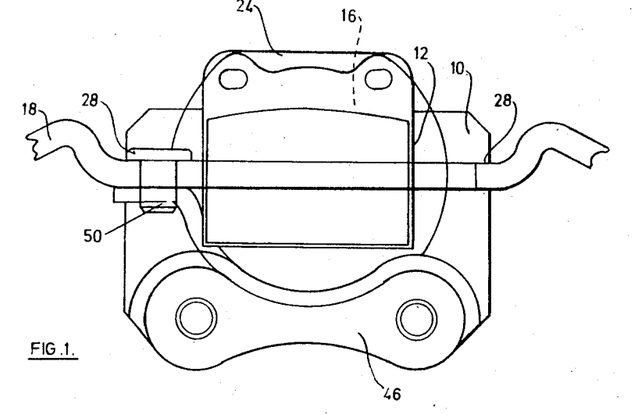
Figure 2:
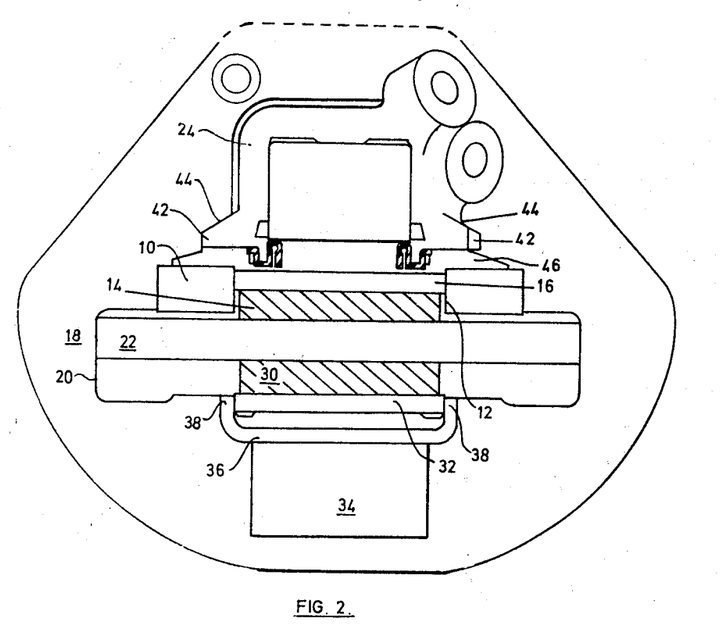
Figures 3, 4:
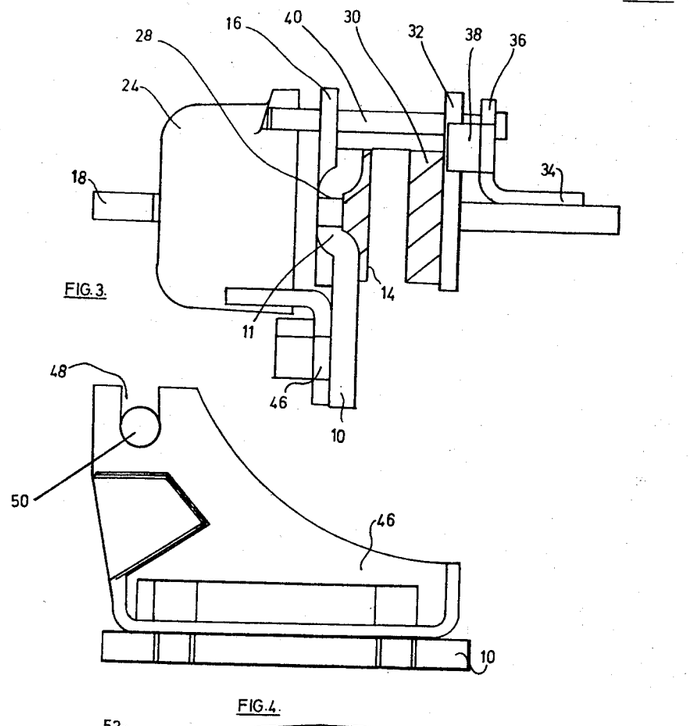

FIG. 1 is a rear elevation with parts removed for clarity, of a disc brake embodying the invention, FIG. 2 is a reverse plan view thereof, partly in section and with parts omitted for clarity, FIG. 3 is a side elevation, partly in section, FIG. 4 is a detail in reverse plan view, FIG. 5 is a rear view of another disc brake embodying the invention, FIG. 6 is a reverse plan view thereof partly in section and with parts broken away for clarity, FIG. 7 is a side elevation, partly in section, FIG. 8 is a front elevation of a further embodiment of the invention, FIG. 9 is a section taken on the line IX—IX of FIG. 8, FIG. 10 is a side elevation, FIG. 11 is a section taken on the line XI—XI of FIG. 10, FIG. 12 is a detail in perspective, FIG. 13 is a front elevation of a still further embodiment of the invention, FIG. 14 is a section taken on the line XIV—XIV of FIG. 13, FIG. 15 is a side elevation, FIG. 16 is a section taken on the line XVI—XVI of FIG. 15, FIG. 17 is a detail in perspective, FIG. 18 is a plan view of a modification of the embodiment shown in FIGS. 13 to 17, FIG. 19 is an elevation, partly in section, of the modification shown in FIG. 18, FIG. 20 is a plan view of a one piece cast torque plate for use in the invention, FIG. 21 is a front elevation of the torque plate, FIG. 22 is a side elevation thereof, FIG. 23 represents a front elevation of another disc brake embodying the invention, FIG. 24 represents a plan view thereof partly in section taken along line XXIV—XXIV of FIG. 23, and FIG. 25 represents a sectional view taken along line XXV—XXV of FIG. 24, Referring firstly to the embodiment of the invention shown in FIGS. 1 to 4 of the drawings, a disc brake includes a stationary torque plate 10 which is adapted to be secured to a fixed part of a vehicle and which is formed in its upper half with a centrally situated recess 12 for receiving a directly operated friction element comprising a friction pad 14 carried on a backplate 16. A yoke plate 18 has a central opening 20 by which it is enabled to straddle a brake rotor in the form of a disc 22. The opening 20 of the yoke plate is extended rearwardly to accommodate a hydraulic actuator including a cylinder 24 housing a piston 26 and the torque plate 10 is provided with lateral grooves 28 in which are located the peripheral edges of the extension of the opening 20 in the yoke plate. The yoke plate is thus radially supported by the torque plate 10 and is guided by the grooves 28 of the latter in a direction towards and away from the disc 22.

An indirectly operated friction element having a friction pad 30 carried on a backplate 32 is mounted on the yoke plate 18 which for this purpose is provided at its forward edge region with a bracket 34 having an upstanding flange 36 terminating at its lateral ends in axially directed portions 38 which embrace the backplate 32. A pair of circumferentially spaced, axially directed guide pins 40 are fixed to the free end face of the cylinder 24 and pass through the friction element backplates 16 and 32 to radially locate the friction elements and to guide them in their movement towards and away from the disc 22. The lateral edges of the torque plate 10 are also deformed locally at 11 on each side of the recess 12 to increase the length over which the directly operated friction element is guided.

The hydraulic cylinder 24 adjacent its free end face with a pair of lateral flanges 42 having inclined rear faces 44 which engage correspondingly inclined abutments on the yoke plate in order to transmit brake applying loads to the indirectly operated friction element. The flanges 42 also serve to support the actuator assembly 24, 26 on the yoke plate.

As will have been noted, the yoke plate is supported at two laterally or circumferentially spaced points by the torque plate grooves 28, and for the purpose of supporting the yoke plate at a third point, the torque plate has secured to it, a rearwardly extending arm 46 which is formed with an open ended slot 48 at its outer end. The yoke plate 18 carries a pin 50 which is received in the slot 48 to constitute a third support point for the yoke plate, the arrangement being such that the three support points define a triangle within which the centre of gravity of the yoke plate lies. By virtue of the presence of the third support point represented by the pin 50, the yoke plate is discouraged from oscillating when the vehicle is travelling over uneven ground and, as shown more clearly in FIG. 4, by offsetting the arm 46 from the centre line of the brake and in a direction towards the leading edge of the yoke plate, there is produced during a braking operation, a couple which opposes the couple arising from the offset of the indirectly operated friction element from the point of drag take off on the torque plate 10. Thus the tendency which would otherwise exist for the yoke plate 18 to swing about the torque plate 10 during a braking operation is countered. Additionally, because of the offset arrangement of the arm 46, the axial dimension of the yoke plate is reduced, thereby facilitating installation of the brake in a vehicle.

Figure 5:
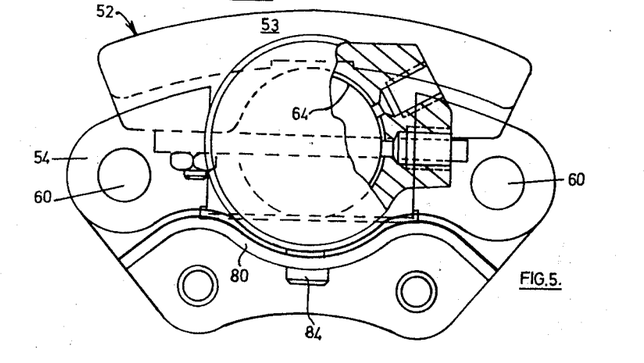
Figure 6:
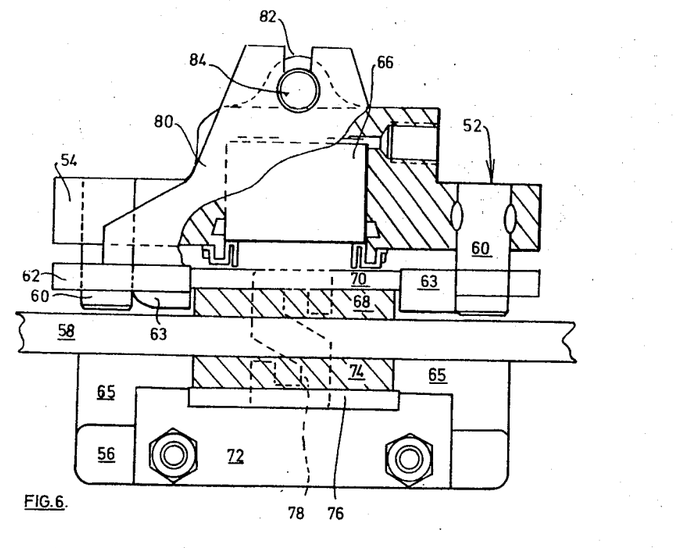
Figure 7:
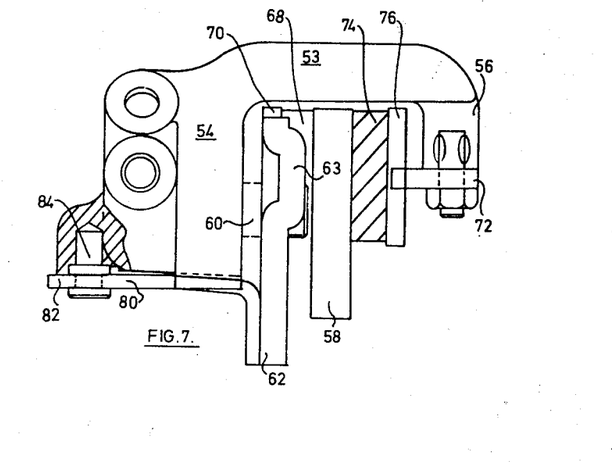
Figure 8:
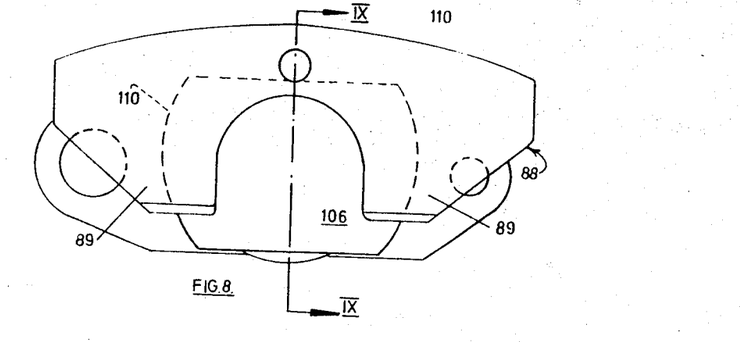
Figure 9:
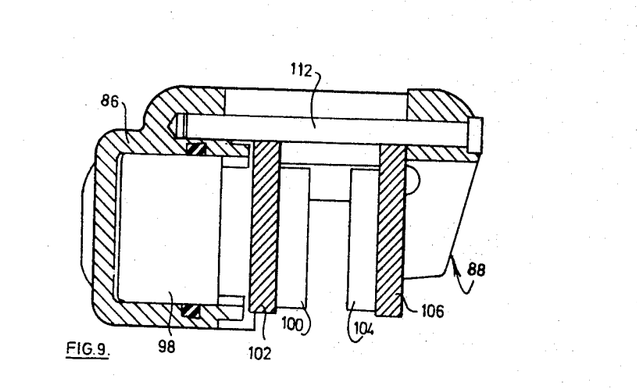
Figure 10:
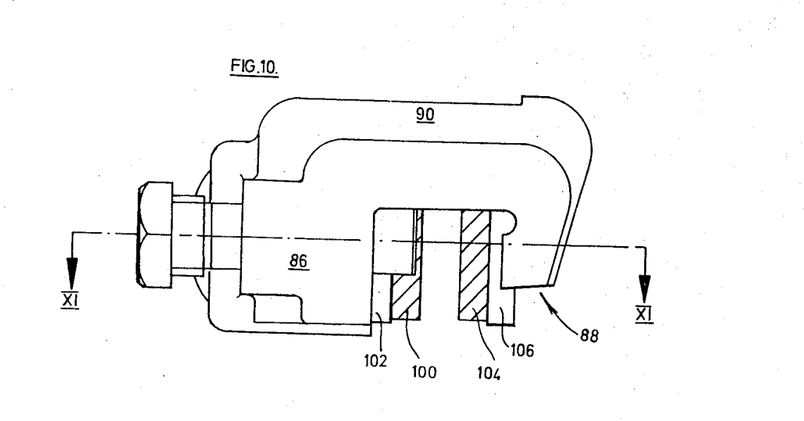

In the embodiment of the invention shown in FIGS. 5 to 7, the yoke plate is replaced by a generally U-shaped housing or caliper 52, the limbs 54 and 56 of which are arranged to straddle a brake disc 58. The caliper is made of cast aluminium and its limb 54 is provided with a pair of circumferentially spaced, forwardly projecting steel pins 60 around which the caliper is cast and which are arranged to slide in correspondingly spaced holes in a torque plate 62 adapted for securing to a fixed part of a vehicle. A central axial bore 64 is formed in the caliper limb 54 to constitute a hydraulic cylinder and within the cylinder 64 is received a piston 66 for displacing a directly operated friction element comprising a friction pad 68 carried on a backplate 70. This directly operated friction element is positioned within a cutout formed in the torque plate to receive it and the torque plate is locally deformed at 63 to increase the length of the path over which the friction element is guided. The front limb 56 of the caliper is bifurcated to provide machining clearance for the hydraulic cylinder 64 and between the forms 65 of the lamb 64 there is bolted a platform 72 for supporting an indirectly operated friction element comprising a friction pad 74 carried on a backplate 76. Both the friction elements are biased by an S-shaped spring 78 which acts between the caliper bridge piece 53 and the friction elements.

In order to provide a third support point for the caliper in addition to the two points provided by the steel pins 60 sliding in the torque plate, a centrally positioned arm 80 is secured to the torque plate to extend towards the rear of the caliper limb 54. This arm 80 is formed with a slotted hole 82 adjacent its rear end and to the caliper there is fixed a pin 84 which engages in the hole 82 to oppose the couple resulting from the offset position of the indirectly operated friction element. As will be appreciated, during a brake applying operation, the piston 66 engages the rear face of the backplate 70 to move the directly operated friction pad 68 into engagement with the brake disc 58, and the reaction which is created by this engagement causes the caliper to slide rearwardly on its pins 60 to bring the indirectly operated friction element into engagement with the opposite face of the disc, and this movement of the caliper is permitted by the slotted nature of the hole 82 in the support arm 80. It is to be noted that the symmetrical shape of the arm 80 renders all the components of this embodiment of the invention suitable for fitting to both the right hand and to the left hand of a vehicle.

The embodiment of the invention shown in FIGS. 8 to 12 is another example of a disc brake construction employing a generally U-shaped caliper having limbs which are arranged to straddle the brake disc and in this embodiment, a caliper having limbs 86 and 88 joined by a bridge piece 90 will be seen to be slidably mounted on a detachable pin 92 carried between axially spaced arms 96 of a torque plate 94 adapted for securing to a fixed part of the vehicle. The rear limb 86 of the caliper is cylindrically bored to receive a hydraulic actuator piston 98 for moving a directly operated friction element comprising a friction pad 100 and a backplate 102 into engagement with the brake disc, while an indirectly operated friction element is carried by the front caliper limb 88 and comprises a friction pad 104 mounted on a backplate 106. A recess 108 conforming to the shape of the backplate 102 is provided in a front wall of the torque plate 94 and the sides of the recess 108 thereby serve to guide the directly operated friction element in its movement towards and away from the brake disc, the drag from this friction element being directly absorbed by the torque plate. The indirectly operated friction element seats in part-circular recesses 110 formed in bifurcations 89 of the caliper front limb 88 and both friction elements are prevented from rotating in their respective seatings by a pin 112 which traverses the caliper bridge piece 90. Conveniently the bridge piece 90 has an opening 91 through which the friction pads 100 and 104 may be inspected or removed.

Figure 11:
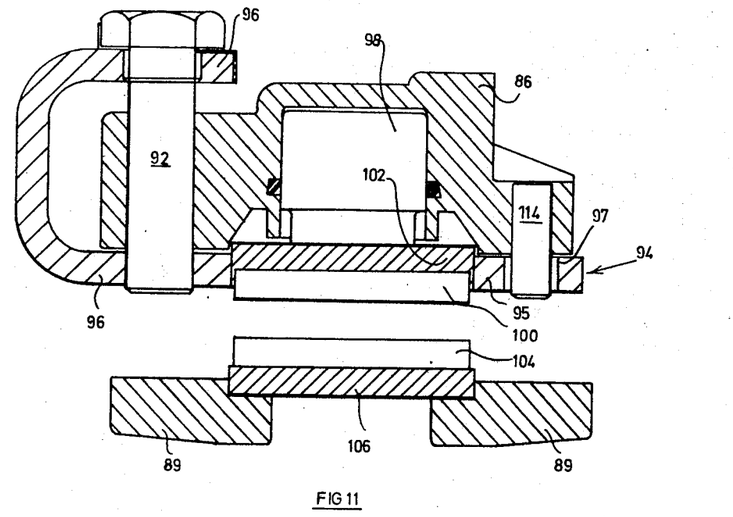
Figure 12:
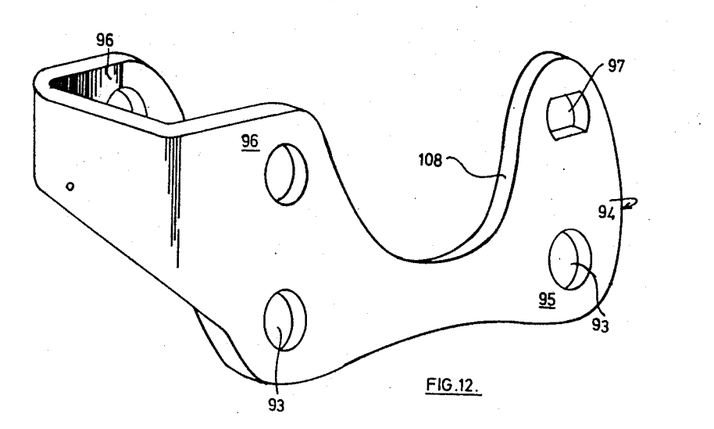
Figure 13:
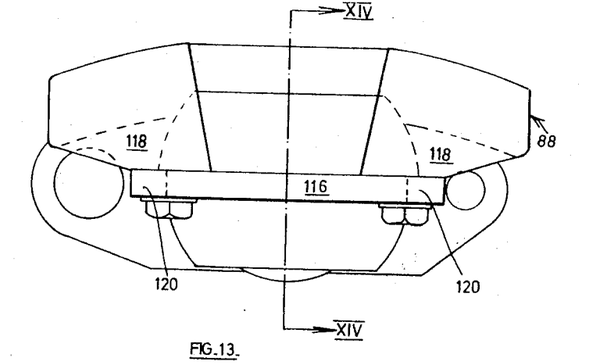
Figure 14:
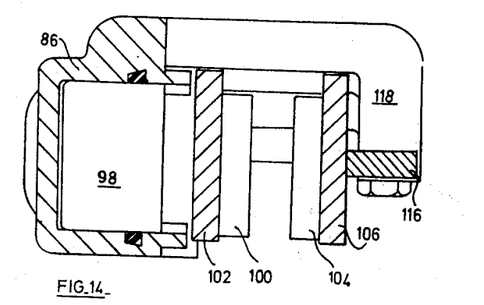
Figure 15:
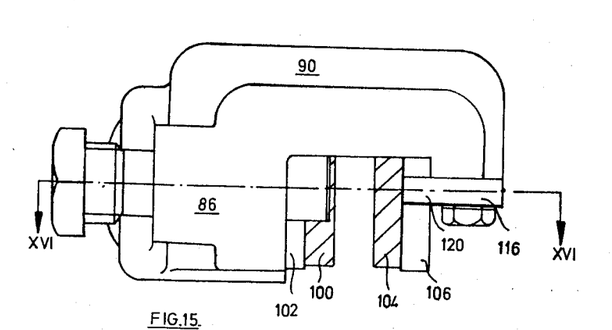
Figure 16:
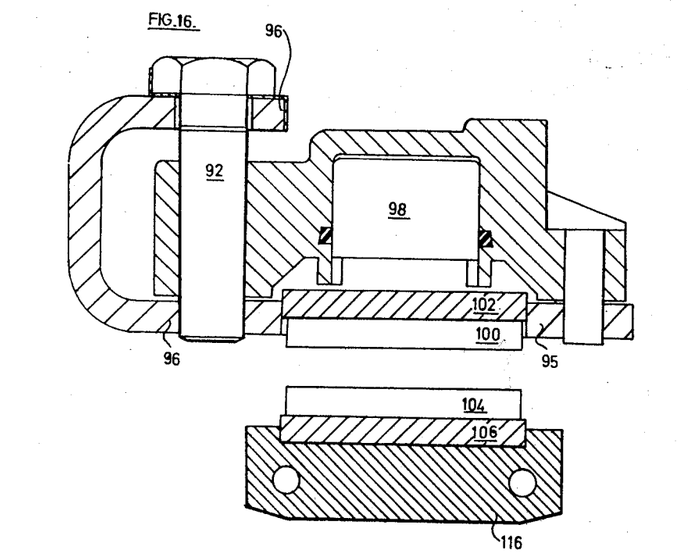
Figure 17:
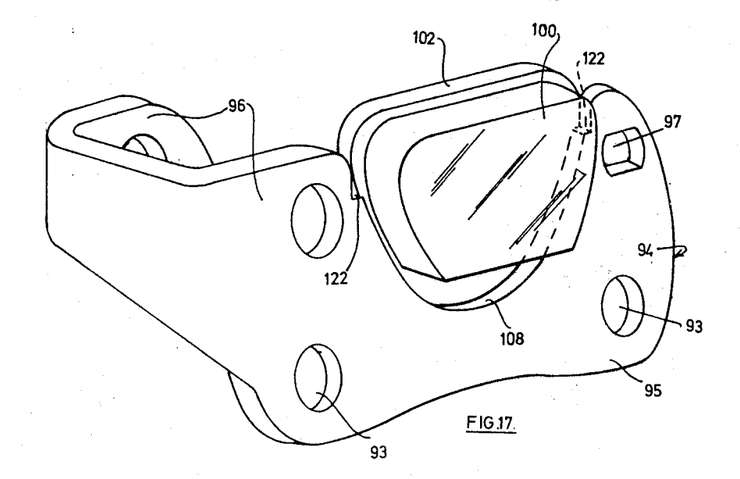

As will be more evident from FIGS. 11 and 12, the torque plate 94 comprises a front wall 95 which at its leading edge constitutes one of the arms 96 and is there bent into a U shape to provide the second arm 96 axially spaced from the first one. At the upper part of the trailing edge region of the torque plate front wall 95 is formed a slotted hole 97 wherein slides a pin 114 fixed to the caliper limb 86 and projecting into the space defined between that limb and the other caliper limb 88. Two circumferentially spaced holes 93 are provided in the lower edge region of the torque plate 94 to enable the plate to be secured to a vehicle. The caliper is thus slidably supported in the plane of the front wall 95 of the torque plate by the engagement of the pin 114 in the hole 97 and by the pin 92 where it passes through the front one of the arms 96, and is also supported at a position spaced from that plane by the passage of the pin 92 through the rear one of the arms 96.

A modification of the preceding embodiment of the invention is shown in FIGS. 13 to 17 inclusive, in which similar reference numerals are employed wherever appropriate to denote similar parts. In the brake shown in FIGS. 13 to 17, the principal difference is that the directly and indirectly operated friction elements are respectively supported in a radial direction by ledges provided on the torque plate 94 and on a platform 116 bolted between the bifurcations of the front limb of the caliper. For this purpose the caliper limb 88 is provided with somewhat foreshortened bifurcations 118 with the platform 116 received across their free ends, and the rear edge of the platform 116 is formed at its ends with lateral ledges 120 which engage in corresponding grooves cut in the lateral edges of the backplate 106 to support the indirectly operated friction element. In order to support the directly operated friction element, the sides of the recess 108 in the torque plate are provided towards their upper ends with rebates defining ledges 122 and the backplate 102 is modified to present complementary shoulders which rest on the ledges 122. In all other respects, the construction and operation of this embodiment of the invention is identical with that of the embodiment previously described.

Figure 18:
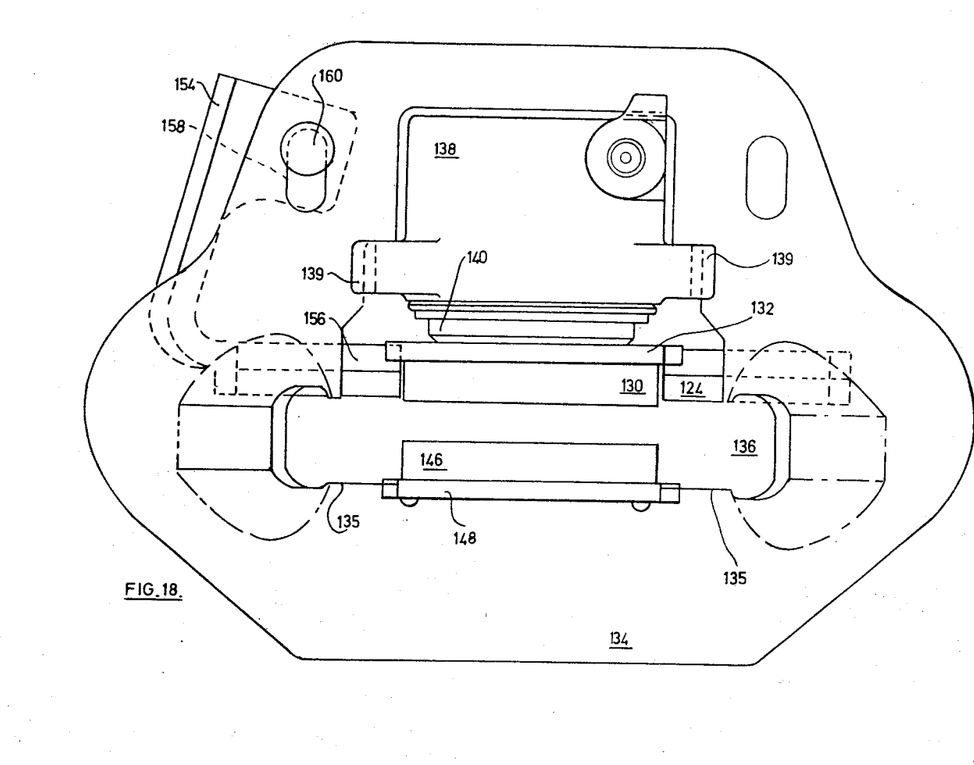
Figure 19:
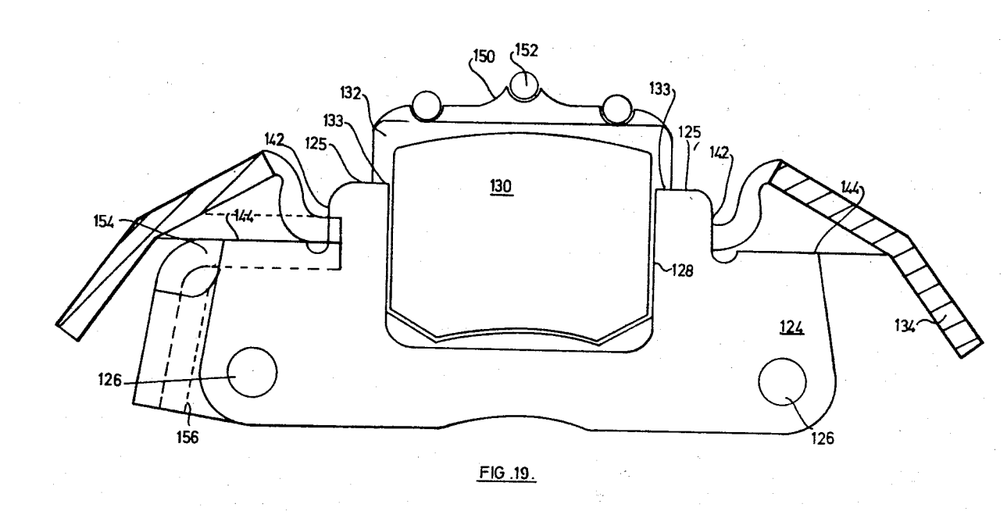

FIGS. 18 and 19 of the drawings show an embodiment of the invention which is generally similar to that of FIGS. 1 to 4 but which lends itself somewhat more readily to component standardization. In FIGS. 18 and 19, a stationary torque plate 124 having fixing holes 126 for securing it to a fixed part of a vehicle has a centrally situated recess 128 wherein is accommodated a directly operated friction element comprising a friction pad 130 carried on a backplate 132. A yoke plate 134 has a central opening 136 for enabling the yoke plate to straddle a brake disc and the opening 136 is extended rearwardly to receive a hydraulic actuator having a hydraulic cylinder 138 housing a piston 140 for moving the directly operated friction element towards the brake disc. As will be noted more readily from FIG. 19, the torque plate 124, at its lateral ends, has its upper edge rebated to define radial shoulders 142 and lateral or circumferential ledges 144. The ledges 144 serve radially to support the yoke plate while the shoulders 142 prevent it from moving laterally. The forward end of the hydraulic cylinder 138 has laterally directed lugs 139 by which it is radially located on the yoke plate.

An indirectly operated friction element having a friction pad 146 carried on a backplate 148 is mounted on the yoke plate 134 at the forward edge of the opening 136 by means of axially directed, circumferentially spaced tags 135 on the yoke which engage cooperating lateral grooves in the backplate 148. The indirectly operated friction element is thus both radially and circumferentially located by this arrangement, whilst in order to provide radial location for the directly operated element which is, of course, circumferentially located by the recess 128 in the torque plate, the free upper edge of the latter constitutes ledges 125 which serve to support laterally overhanging shoulders 133 of the backplate 132, and a hold down spring 150 is arranged to act between the backplate 132 and a fixed pin 152 carried by the hydraulic cylinder 138.

The two-point support for the yoke plate which is provided by the radial shoulders 142 and the ledges 144 is supplemented by a third support point presented by a rearwardly extending arm 154 of a pressed steel plate 156 secured to and backing up the torque plate. The arm 154 is formed at its free end region with a slotted hole 158 engaged by a pin 160 carried by the yoke plate, the slotted connection permitting relative movement between the torque plate and its arm on the one hand and the yoke plate on the other. In practice, a pair of slotted holes 158 are provided in the yoke plate so that the yoke plate, the torque plate and the backing plate 156 constitute standard components for left or right hand brake assemblies. In all other respects, the brake of FIGS. 18 and 19 is similar in construction and operation to the embodiment shown in FIGS. 1 to 4.

Figure 20:
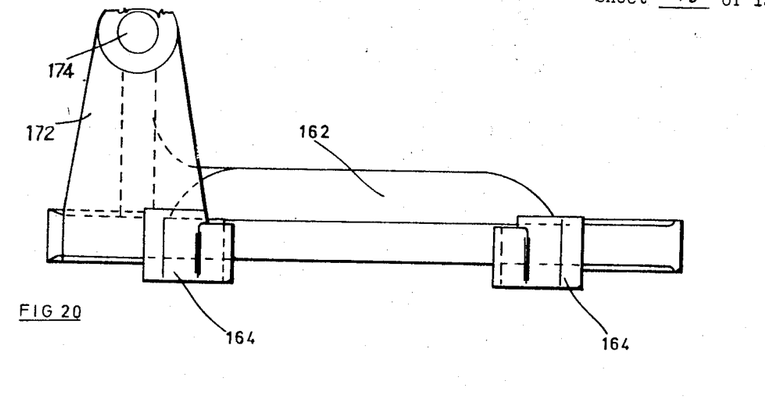
Figure 21:
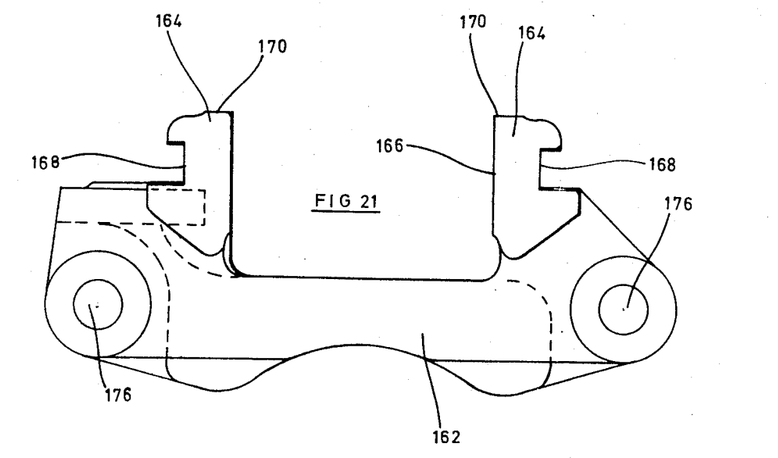
Figure 22:
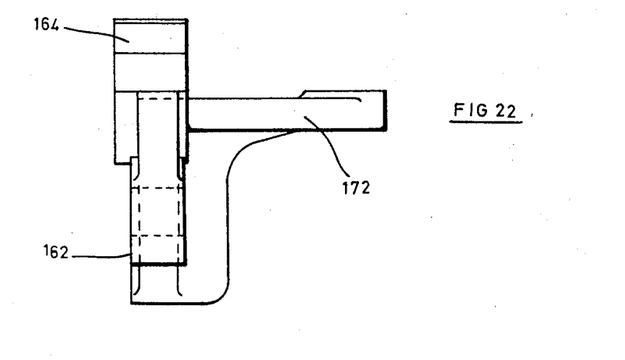

Instead of providing a separate torque plate 124 and arm 154 as shown in the preceding embodiment of the invention, these two components may in effect be combined into a one piece casting as shown in FIGS. 20 to 22 inclusive. As illustrated in those figures, a one piece casting comprises a main body portion 162 which is formed at its ends with circumferentially spaced, radially directed extensions 164 defining between them a centrally situated recess 166. The extensions 164 are provided in their lateral faces with grooves 168 which serve to support and locate a yoke plate while the recess 166 provides circumferential location for a directly operated friction element as hereinbefore described. Radial location for the directly operated friction element is provided by ledges 170 situated at the free outer edges of the extensions 164. At its leading edge, the main body portion 162 is continued as a rearwardly extending arm 172 which at its outer end is provided with a hole 174. The arm 172 and its hole 174 provide a third support point for a yoke plate when engaged in the grooves 168. Fixing points 176 for securing the cast torque plate to a vehicle are arranged at each end of the body portion 162.

Figure 23:
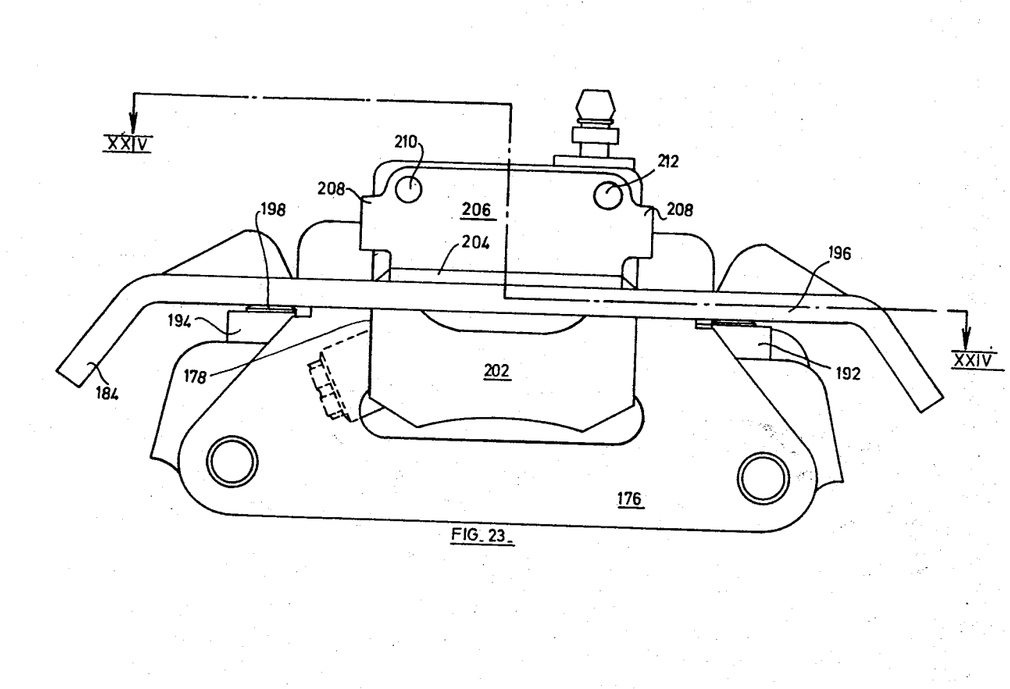
Figure 24:
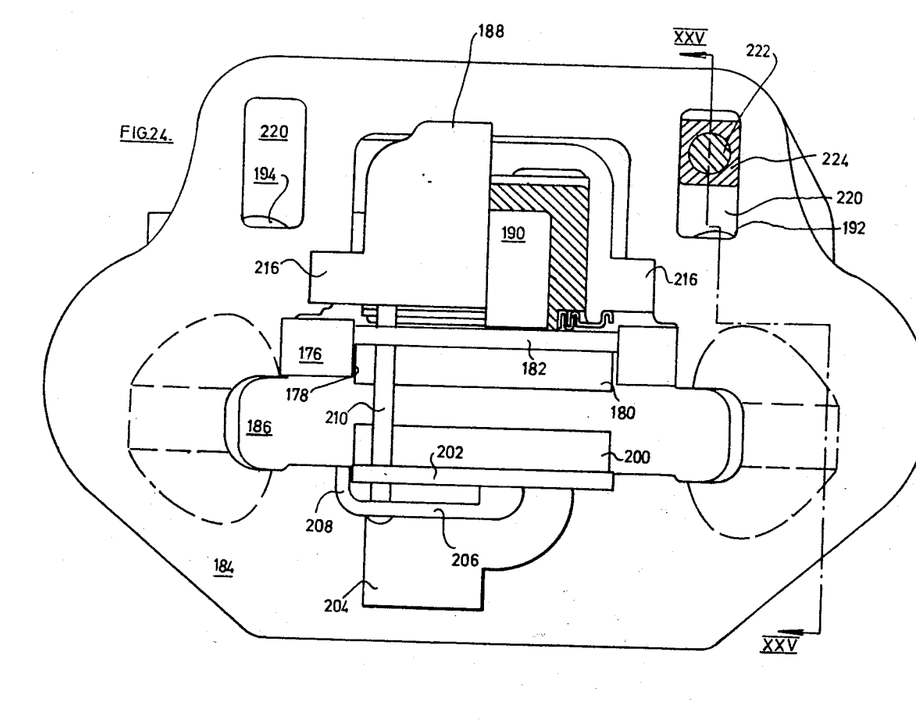
Figure 25:
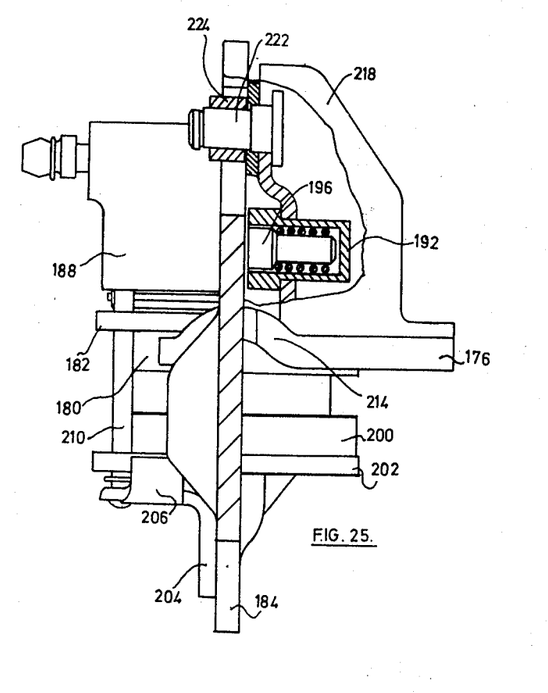

FIGS. 23, 24 and 25 represent a modification of the embodiment illustrated in FIGS. 1 to 4.

Referring to the embodiment of the invention shown in FIGS. 22 to 25 of the drawings, a disc brake includes a stationary torque plate 176 which is adapted to be secured to a fixed part of a vehicle and which is formed in its upper half with a centrally situated recess 178 for receiving a directly operated friction element comprising a friction pad 180 carried on a backplate 182. A yoke plate 184 has a central opening 186 by which it is enabled to straddle a brake rotor in the form of a disc (not shown). The opening 186 of the yoke plate is extended rearwardly to accommodae a hydraulic actuator including a cylinder 188 housing a piston 190 and the torque plate 176 is provided with lateral grooves 191 in which are located the peripheral edges of the extension of the opening 186 in the yoke plate. The yoke plate is thus radially supported by the torque plate 176 and is guided by the grooves of the latter in a direction towards and away from the disc.

An indirectly operated friction element having a friction pad 200 carried on a backplate 202 is mounted on the yoke plate 184 which, for this purpose is provided at its forward edge region with a bracket 204 having an upstanding flange 206 terminating at its lateral ends in axially directed portions 208 which embrace the backplate 202. A pair of circumferentially spaced, axially directed guide pins 210 and 212 are fixed to the free end face of the cylinder 188 and pass through the friction element backplates 182 and 202 to radially locate the friction elements and to guide them in their movement towards and away from the disc. The lateral edges of the torque plate 176 are also deformed locally at 214 on each side of the recess to increase the length over which the directly operated friction element is guided.

The hydraulic cylinder 188 adjacent its free end face with a pair of lateral flanges 216 which engage abutments on the yoke plate in order to transmit brake applying loads to the indirectly operated friction element. The flanges 216 also serve to support the actuator assembly 188, 190 on the yoke plate.

As will have been noted, the yoke plate is supported at two laterally or circumferentially spaced points by the torque plate grooves, and for the purpose of supporting the yoke plate at a third point, the torque plate has secured to it, a rearwardly extending arm 218. The yoke plate 184 has two circumferentially spaced slots 220 one of which receives a pin 222 positioned in a bushing 224 to constitute a third support point for the yoke plate, the arrangement being such that the three support points define a triangle within which the centre of gravity of the yoke plate lies. In order to urge the yoke plate into the grooves, there are provided a pair of housings 192 and 194 having spring load plungers 196 and 198.

By virtue of the presence of the third support point represented by the pins 222 and the bushing 224, the yoke plate is discouraged from oscillating when the vehicle is travelling over uneven ground and by offsetting the arm 218 from the centre line of the brake and in a direction towards the leading edge of the yoke plate, there is produced during a braking operation, a couple which opposes the couple arising from the offset of the indirectly operated friction element from the point of drag take off on the torque plate 176. Thus the tendency which would otherwise exist for the yoke plate 184 to swing about the torque plate 176 during a braking operation is countered. Additionally, because of the offset arrangement of the arm 218, the axial dimension of the yoke plate is reduced, thereby facilitating installation of the brake in the limited space between the disc and the vehicle suspension system and chassis.

While the invention has been described by reference to certain embodiments, it is to be understood that it is not to be limited thereby.

I claim:

1. In a spot type brake for a vehicle including a brake rotor having opposed braking surfaces, a torque plate rigidly fixed to said vehicle on one side of said rotor, a directly actuated friction element slidable on said torque plate for movement towards and away from said one side of said rotor, a pair of circumferentially spaced mounting and guiding means on said torque plate, a caliper straddling a portion of said rotor and slidably received on said mounting and guiding means, an indirectly actuated friction element carried by said caliper on the other side of said rotor, actuator means for moving said directly actuated element and said caliper in opposite direction to apply said directly actuated element to one side of said rotor and then by reaction to move said caliper in the opposite direction and apply the indirectly actuated element to the other side of said rotor, the invention which comprises third mounting and guiding means carried by said torque plate in spaced axial relation with respect to said circumferentially spaced mounting and guiding means, said caliper including a part slidably engaging said third mounting and guiding means, all of said mounting and guiding means cooperating to oppose any turning coupled exerted by said indirectly actuated friction element on said caliper when said friction elements are in contact with said rotor, said torque plate being formed with a recess for receiving said directly operated friction element and having a pair of circumferentially spaced holes therein, said caliper having a pair of circumferentially spaced, forwardly projecting steel pins arranged to slide in said holes in said torque plate and constituting two support points for said caliper, a centrally positioned arm secured to said torque plate extending towards the rear of the caliper, the arm having a slotted hole adjacent its rear end, a pin fixed to the caliper engaging in said slotted hole to constitute the third mounting and guiding means for said caliper, said three mounting and guiding means defining a triangle in which is located the centre of gravity of said caliper.

2. The brake according to claim 1 wherein said torque plate is of generally U-shaped section.

3. The brake according to claim 1 wherein the three mounting and guiding means define a triangle in which lies the center of gravity of said caliper member and said actuator means.

4. The brake according to claim 1 wherein said third mounting and guiding means is offset from the center line of said yoke member.

5. The brake according to claim 4 when said third mounting and guiding means is offset to a position in substantial axial alignment with one of the circumferentially spaced mounting and guiding means.

References Cited

UNITED STATES PATENTS 3,245,500  4/1966  Hambling et al.
3,299,991  1/1967  De Castelet __________ 188—73

FOREIGN PATENTS 717,350  10/1954  Great Britain.

GEORGE E. A. HALVOSA, *Primary Examiner.*